UNITED STATES PATENT OFFICE.

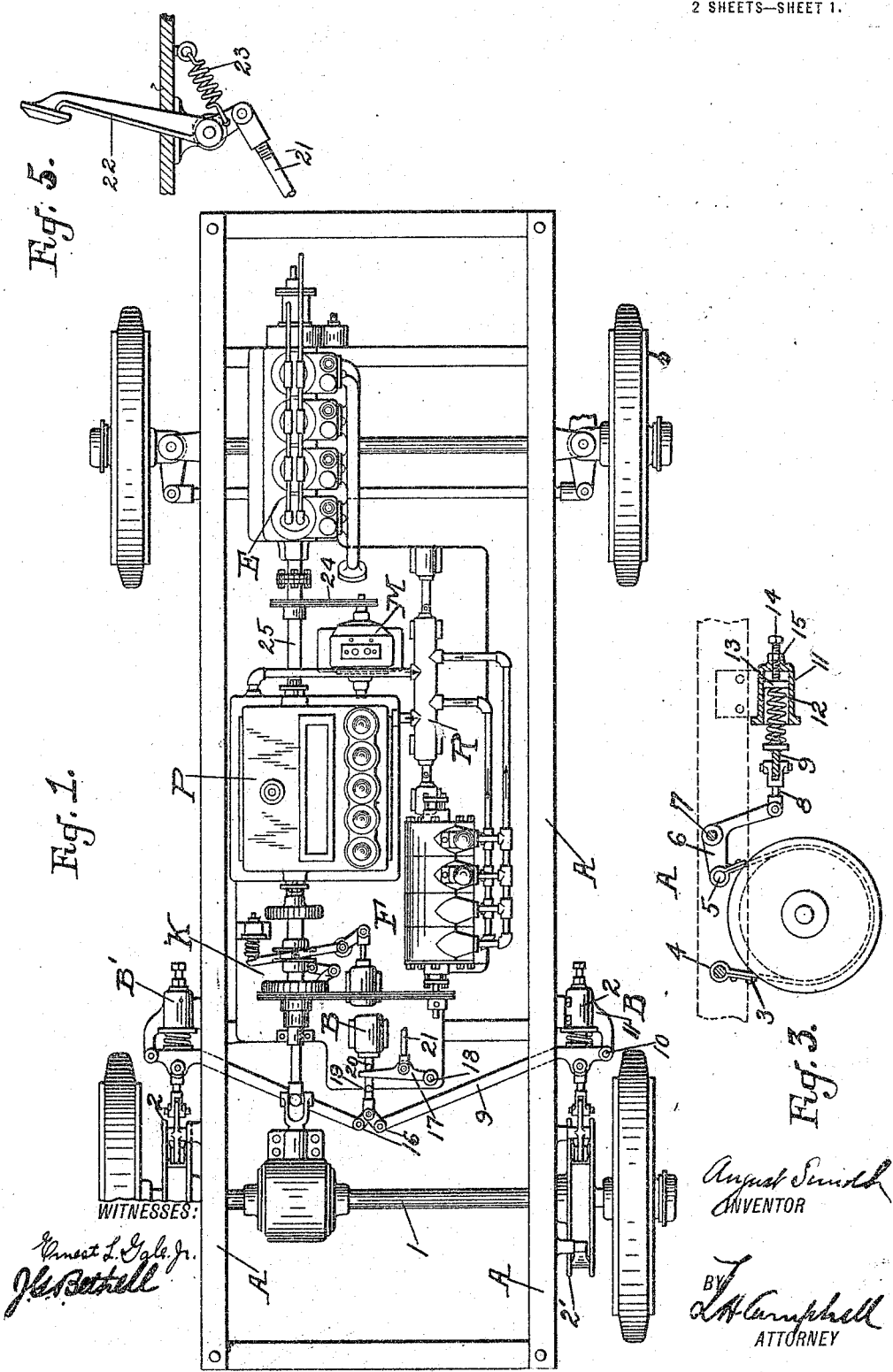

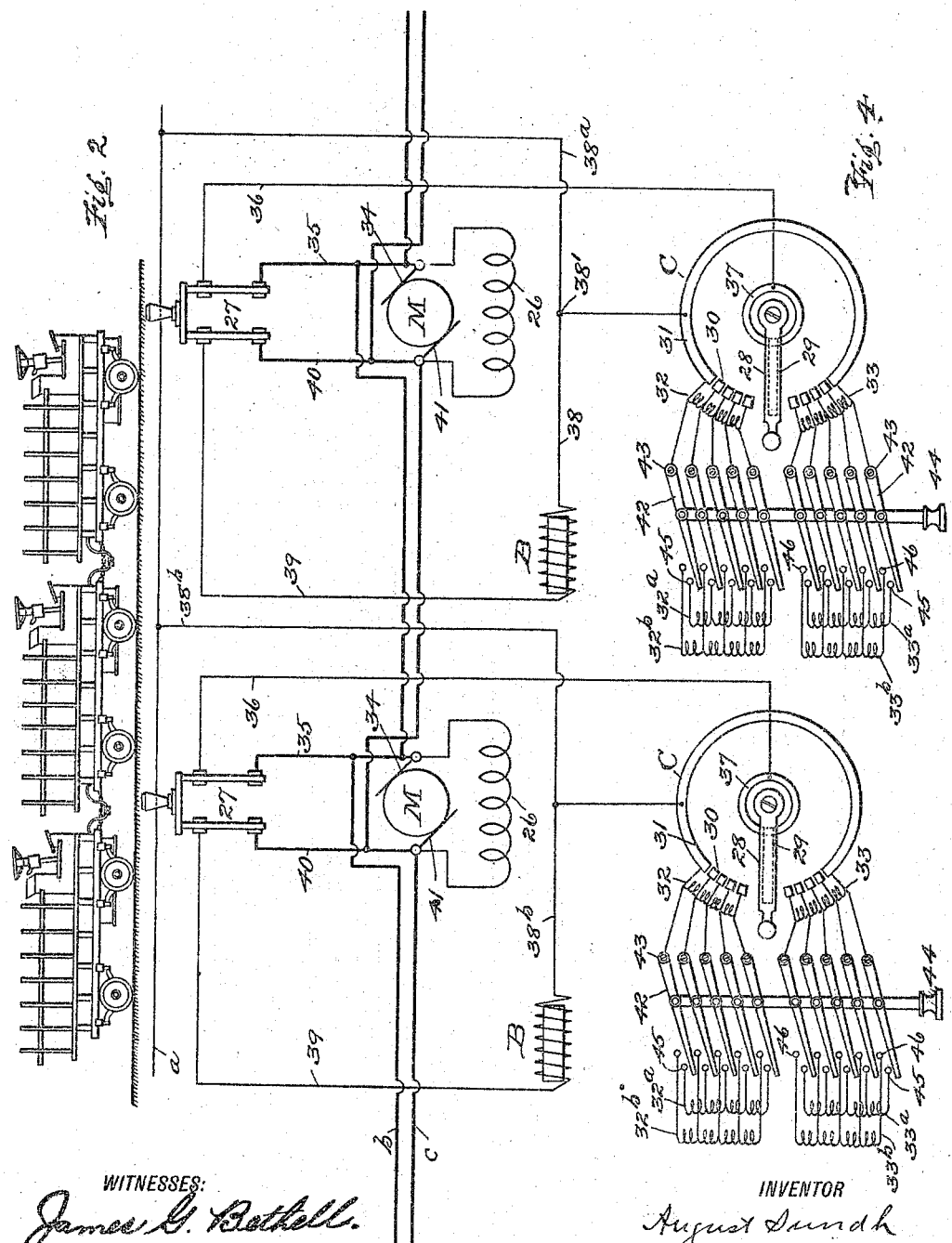

AUGUST SUNDH, OF HASTINGS-UPON-HUDSON, NEW YORK, ASSIGNOR TO OTIS ELEVATOR COMPANY, A CORPORATION OF NEW JERSEY.

MULTIPLE CONTROL SYSTEM FOR BRAKES.

1,182,228.

Specification of Letters Patent.

Patented May 9, 1916.

Original application filed April 3, 1909, Serial No. 487,700. Patent No. 1,055,569, dated March 11, 1913. Divided and this application filed January 11, 1913. Serial No. 741,435.

*To all whom it may concern:*

Be it known that I, AUGUST SUNDH, a citizen of the United States, residing at Hastings-upon-Hudson, in the county of Westchester and State of New York, have invented a new and useful Improvement in Multiple Control Systems for Brakes, of which the following is a specification.

My invention relates to a multiple system of electrical control for electromagnetic brake operating devices, and is particularly adapted for use on cars, automobiles, trucks, etc., in which a plurality of cars or units are each equipped with independently operative mechanism for driving the said cars or units, each having an electromagnetic brake operating device, means for supplying current thereto, and a controlling device operable manually to effect the synchronous operation of the brake mechanism, from a single point, when connected together to form a train.

Another object of my invention is to provide means simultaneously to vary the supply of current to all of the brake operating devices, from a single point, and thereby vary in synchronism the power with which the brakes are applied or held in applied position.

Referring to the drawings, Figure 1 is a plan view of an automobile truck equipped with an internal combustion engine, fluid power transmission mechanism, and an electromagnetic brake operating device; Fig. 2 is an elevation view of a train of trucks or motor vehicles; Fig. 3 is a detail view of a portion of the brake mechanism; Fig. 4 is a diagrammatic view of the controlling devices and the electric circuits therefor; Fig. 5 is a view of a manually operative foot lever.

The general arrangement of the parts as shown in Fig. 1, comprises a prime mover or engine E, a pump P coupled to the prime mover; a fluid motor F adapted to be driven by fluid pressure supplied from the pump, a reversing valve R; gearing connecting the motor F to the driving axle of the automobile; clutch mechanism K adapted to disconnect the motor F and connect the engine E to the driving axle independently of the fluid motor; brake mechanism, B, B¹ and B², and a small generator M geared to the engine adapted to furnish electric current for operating the electromagnet B.

The mechanism above referred to generally is disclosed in Patent No. 1,055,569, issued to me on March 11, 1913, for multiple unit power transmission mechanism, of which this application is a division. It will be seen of course that it is not intended in this application to describe all the mechanism above referred to further than to indicate in a general way the same, in order to enable me to present herein a sufficient explanation of the application of the principle of my multiple system of electrical control to a plurality of electroresponsive brake operating devices, in which I have contemplated applying the principle.

Referring now to the drawing, I will describe only the mechanism which forms the subject-matter of this application.

The brake mechanism in Fig. 1 will now be described. Secured to the driving axle 1 are brake pulleys 2 and 2'. As the construction of the brake mechanism for each brake pulley is substantially the same, the description of one will suffice for both.

Referring to Fig. 3, one end 4 of a brake strap 3 is connected to the frame A of the machine. This brake strap extends around the brake pulley, and its opposite end 5 is connected to a bell crank lever 6, pivoted at 7. The lower end of the bell crank lever is connected by a link 8 to a lever 9. The outer end of the lever 9 is pivoted at 10 to a bracket 11 bolted to the frame A. This bracket is formed with a cup-shaped member in which is located a coil spring 12, the outer end of which bears against the lever 9. The inner end of the spring 12 bears against a stop 13 in the bracket 11. A set screw 14 serves to adjust the position of the stop 13, and thereby adjust the tension of the spring. A set nut 15 may be provided to hold the set screw in its adjusted position. The levers 9 are connected to the core of an electromagnet B by means of links 16. When the magnet B is deënergized the springs 12 exert a pressure on the lever 9 which is transmitted through the links 16 and bell crank levers 6, and serves to hold the brake straps applied to the brake pulleys. When the brake magnet B is excited it operates to draw the inner ends of the levers 9 forward, compressing the springs 12, and moving the bell crank levers into position to release the brake straps from the brake pulleys. A device for manually applying the brakes independently of the brake magnet is also provided. This device comprises a lever 17 pivoted at 18. The free end of the lever extends between pins 19 and 20 carried by the core of the brake magnet. A link 21 is pivoted to the lever 17 and extends to the forward part of the machine. The forward end of this link is connected to a foot lever 22, located in any convenient position for operation. A coil spring 23 connected to the foot lever serves to hold it normally in its upper position. The pins 19 and 20 are so located with respect to the lever 17 that the core of the brake magnet B may be moved in or out without disturbing the foot lever 22. When the foot lever is depressed the lever 17 will exert pressure against the pin 19, and serve to apply the brakes. If the brake magnet is at this time deënergized, and the brakes are already applied, the braking action may be increased by pressure on the foot lever. The latter may also be operated in opposition to the brake magnet if desired, as for example, in case of an emergency, when it is desired to quickly apply the brakes.

Referring now to Fig. 4, a small generator M is provided for each car or unit to supply current to the brake magnets B. This generator may be located in any convenient position, and is connected in any suitable way to the engine E. A belt or chain 24, connects the generator with the shaft of the engine, as shown in Fig. 1. This generator, is a shunt wound machine, having a shunt field coil 26. A switch 27 may be provided to disconnect the generator from the various circuits leading therefrom whenever desired. The manually operable controller C comprises a lever 28 which carries a contact strip 29 adapted to engage the electrical contacts 30, 31, etc. Sections 32 and 33 are resistances for the electromagnet B, controlling the brake mechanism. The system of circuits will first be described in connection with the electromagnetic brake operation of a single car or unit: Assuming that the controller lever 28 is in its central or off position, as shown, the brake mechanism will be applied. If it be thereupon moved in a clockwise direction as viewed in the figure, for example, it will engage successively first the series of contacts 30, connected by the resistance coils 32. This establishes a circuit from the generator M to the brake magnet coil as follows: from the commutator brush 34, through the conductor 35, switch 27, conductor 36, contact ring 37, switch lever 29, contacts 30, resistance coils 32, contact 31, conductor 38, coil of brake magnet 8, conductor 39, switch 27, conductor 40 to the other brush 41. The coil B will now receive current, which is reduced by the resistance 32, so that the brakes are only partially operated or released. If the handle be moved over the contacts 30, the resistance 32 will be gradually cut out of the circuit, and the magnet B will receive more current and become energized sufficiently to operate or release completely the brakes. When the lever is moved back to its central or off position, the brake magnet is gradually deënergized to allow the brakes to be applied. When the controlling lever is moved in a counter-clockwise direction, it affects the operation of the brake mechanism in the same manner as described above. When a plurality of cars or units are connected to be controlled from a single point, the electrical circuits for their respective electromagnetic brake operating devices, etc., are connected in parallel by a conductor $a$. The generators M may also be connected in parallel by conductors $b$ and $c$. These conductors $a$, $b$ and $c$ may be supported and connected together in any suitable way, as for example, as shown in my original Patent No. 1,055,569. With the circuits thus connected, the operation of one controlling lever serves to control the said electromagnetic brake operating devices for all the cars or units. I also provide an arrangement, employed to vary the resistance in the circuits for the additional brake magnets. Resistances $32^a$ and $32^b$ are adapted to be connected in parallel with the resistance 32. A plurality of switch levers 42, each having a pivot 43, are connected to an operating rod 44, movable longitudinally to impart a parallel movement to the switch levers. When the rod 44 is moved inward from the position shown the switch levers first engage a series of contacts 45, and thereby connect the resistances $32^a$ and $33^a$ in parallel with the resistances 32 and 33. A further movement of the rod 44 brings the switch levers into engagement with a series of contacts 46, and thereby connects the resistances $32^b$ and $33^b$ in parallel with the other resistances. When a single car or unit is in use the resistances 32 and 33 only are in the circuit, the operating rod 44 being in the off position shown in Fig. 2. When two units are connected for operation together the resistances $32^a$ and $33^a$ are introduced in parallel with the resistances 32 and 33 in order to reduce the total resistance. This is for the purpose of preventing an increase in the drop in potential through the resistances, owing to the increased current required when the brake magnet coils are connected in parallel. In other words, the arrangement provides a means for supplying an equal amount of current to the brake magnet circuits when more than one car or unit is being operated. When three units are connected together the resistances $32^b$ and $33^b$ are also introduced for the same purpose. It will be understood that as many additional sections of resistance may be added and controlled by a single operating rod or lever as desired, the number depending upon the number of units it may be desirable to use in a single series or train.

The electrical circuit for a plurality of electromagnetic brake devices connected to be controlled from a single point are as follows: If the lever 28 shown on the right in Fig. 4 is moved in a clockwise direction to engage the contacts 30, a circuit will be established through the brake magnet B of the said unit as before described. The circuit for the brake magnet of the other unit branches from the conductor 38 at the junction 38' and may be traced through conductors 38ª, a, 38ᵇ of the second unit and through the magnet B of the second truck. The brake devices will therefore all be operated simultaneously. In like manner each step in the control of the electromagnetic brake operating device is effected simultaneously for all the cars or units.

It will be seen from the foregoing description that the invention comprises a multiple system of electrical control for electromagnetic brake operating devices adapted for use on cars or other units, in which a plurality of cars or units are each equipped with independently operative brake mechanism and a manually operable controlling device operable from a single point, when the cars or units are connected to form a train, whereby the said brake mechanism of all the units may be controlled simultaneously.

The present invention might also be adapted for various other uses by such changes and modifications as would be within the skill of the art, and it is to be further understood that various changes in details of construction and the arrangement of parts might readily be made by those skilled in the art without departing from the spirit and scope of the invention. I wish therefore not to be limited to the particular construction herein set forth.

What I claim as new and desire to secure by Letters Patent of the United States is:—

1. The combination with a plurality of vehicles connected to form a train, spring applied brakes for each vehicle, electro-magnetic brake operating devices connected to the brakes, means for supplying current to operate said devices, and means for simultaneously varying the supply of current to all of said brake operating devices, and thereby varying in synchronism the power with which the brakes are applied or held in applied position.

2. The combination with a plurality of devices to be operated, brakes therefor, electro-magnetic brake operating mechanism, means for supplying current to operate said mechanism, means for operating any desired number of said devices in unison, resistance, and means for placing in circuit with the brake mechanism portions of said resistance corresponding to the number of said devices operated in unison.

3. The combination with a plurality of vehicles connected to form a train, spring applied brakes for each vehicle, electromagnetic brake operating devices connected to the brakes, means for supplying current to operate said devices, and means operable for either direction of the train's travel, for simultaneously varying the supply of current to all of said brake operating devices, and thereby varying in synchronism the power with which the brakes are applied or held in applied position.

4. In combination, a plurality of self propelled vehicles connected together to form a train, means for generating electric current, brake mechanism for each car and operated by said current, a controlling device carried by each car operable manually to vary the supply of current to the brake operating device, means carried by one of said cars and operable manually to simultaneously vary the current supply to all of the brake operating devices for either direction of the train's travel.

5. In combination, a plurality of self propelled vehicles connected together to form a train, means for generating electric current, brake mechanism for each car and operated by said current, a controlling device carried by each car operable manually to vary the supply of current to the brake operating device, means carried by each one of the above-mentioned vehicles, which, when used in conjunction with the first named device of any of the said vehicles is operable from a single point to vary the supply of current to all of the brake operating devices simultaneously.

6. The combination with an electromechanical brake, means for releasing and applying the brake, comprising brake pulleys, brake shoes, a bell crank lever for each brake shoe and connected thereto, an electromagnet device, a magnet core, pivoted levers having link connections to each of the bell crank levers, and links connecting the latter named levers with the magnet core to effect the releasing of the brake shoes simultaneously when the magnet winding is energized to attract its core to an operative position.

7. The combination with a vehicle of the self propelling type, a brake device therefor comprising an electromagnet, a system of leverage operative to release the brake mechanism, springs operative through the above mentioned system of leverage to apply the brake, a device operable manually to apply additional braking power to the brake, said device comprising a manual lever, and a lost motion connection between the manual lever and said system of leverage permitting the latter to operate independently of the manual lever.

8. The combination with a vehicle of the self propelling type, a brake device therefor comprising an electromagnet, a system of leverage operative to release the brake mechanism, springs operative through the above mentioned system of levers to apply the brake, a device operable manually to apply additional braking power to the brake, said device comprising a manually operated lever, a second lever, a connection between the manually operated lever and the said second lever, a connection between said second lever and the said system of leverage, said connection being operable to allow lost motion between the second lever and the system of levers when operated to release the brake, but will operate to apply the brake when the manual lever is operated.

In testimony whereof, I have signed my name to this specification in the presence of two subscribing witnesses.

AUGUST SUNDH.

Witnesses:
WALTER C. STRANG,
JAMES G. BETHELL.